United States Patent [19]

Wollenweber et al.

[11] Patent Number: 4,989,940
[45] Date of Patent: Feb. 5, 1991

[54] METHOD OF AND DEVICE FOR ALIGNING AN OPTICAL FIBER WITH RESPECT TO THE LENS OF A CONNECTOR

[75] Inventors: Heinrich W. Wollenweber, Vettweiss; Detlev Lohmuller, Bonn; Achim P. Mihm; Wolfgang W. Eutin, both of Cologne, all of Fed. Rep. of Germany

[73] Assignee: U.S. Philips Corp., New York, N.Y.

[21] Appl. No.: 470,293

[22] Filed: Jan. 25, 1990

[30] Foreign Application Priority Data

Jan. 26, 1989 [DE] Fed. Rep. of Germany ....... 3902264

[51] Int. Cl.$^5$ .............................................. G02B 6/32
[52] U.S. Cl. ................................ 350/96.18; 350/96.20
[58] Field of Search ............... 350/96.15, 96.18, 96.20, 350/96.21

[56] References Cited

U.S. PATENT DOCUMENTS 3,938,895 2/1976 Bridger et al. ...................... 356/152
4,452,506 6/1984 Reeve et al. ...................... 350/96.15

FOREIGN PATENT DOCUMENTS 2082342 3/1982 United Kingdom .

Primary Examiner—Akm Ullah
Attorney, Agent, or Firm—Ernestine C. Bartlett

[57] ABSTRACT

The invention relates to a device and method of aligning an optical fibre (4) with respect to the lens (2) of a connector, the optical fibre (4) being positioned such that a beam issuing from the optical fibre (4) and passing through the lens (2) is directed concentrically at a four-quadrant measuring device (8). A very simple method is obtained in that the four-quadrant measuring device (8) is provided with a focussing lens (10) at a distance equal to the focal length, and in that the axial distance between the front face of the optical fibre (4) and the lens (2) of the connector is adjusted such that the sum of the light intensities measured by the four elements (9) of the four-quadrant measuring device (8) has a minimum value.

20 Claims, 1 Drawing Sheet

METHOD OF AND DEVICE FOR ALIGNING AN OPTICAL FIBER WITH RESPECT TO THE LENS OF A CONNECTOR

FIELD OF THE INVENTION

The invention relates to a method of aligning an optical fiber with respect to the lens of a connector, the optical fiber being positioned such that a light beam issuing from the optical fiber and passing through the lens is directed concentrically at a four quadrant measuring device.

BACKGROUND OF THE INVENTION

In a similar method described in GB-A 2 082 342 the beam issuing from the lens of a connector is split up. A subbeam is directed at a four-quadrant diode. The second subbeam passes through a focusing lens on to a video camera. The output signals of the four quadrant diode are used for the aligned positioning of an optimal fiber in coordinates which extend perpendicularly to the direction of the axis. The alignment in the direction of the axis takes is governed by the light spot of the second subbeam produced by the video camera.

SUMMARY OF THE INVENTION

An object of the invention is to simplify the method of aligning an optical fiber with respect to the lens of a connector, the optical fiber being positioned such that a light beam issuing from the optical fiber and passing through the lens is directed concentrically at a four quadrant measuring device.

This object is achieved in that the four-quadrant measuring device is provided with a focusing lens at a distance equal to the focal length, and the axial distance between the front face of the optical fiber and the lens of the connector is adjusted such that the sum of the light intensities measured by the four elements of the four-quadrant measuring device has a minimum value.

As the light-sensitive faces of the four single elements of a four-quadrant measuring device do not cover a central area, the sum signal of the individual elements is smallest when the light spot incident on the four-quadrant measuring device is smallest, i.e. when the focal point is adjusted. By virtue hereof, the four-quadrant measuring probe can be used, in accordance with the invention, for axially aligning the optical fiber. A sum signal is obtained which is directly suitable for controlling a manipulator, so that the axial optical fiber distance can be automatically adjusted. Hence, a preferred embodiment of the method according to the invention is characterized in that the distance between the lens of the connector and the front face of the optical fiber is adjusted by means of a manipulator which is controlled by the sum of the signals formed by the individual elements of a four-quadrant measuring device, in such a manner that the sum signal attains a minimum value.

A device for carrying out the inventive method of aligning an optical fiber with respect to the lens of a connector using means to displace the optical fiber relative to the lens and comprising a four-quadrant measuring device at which the beam issuing from the optical fiber is directed, is characterized in that the four-quadrant measuring probe is arranged in the focal point of a focussing lens, and in that the output signals of the four-quadrant measuring probe are supplied to a summing circuit which forms a sum signal from the individual signals of the four quadrant elements.

The automatic positioning of an optical fiber in the axial direction is made possible in that the sum signal is supplied to a control circuit of a manipulator which cooperates with the optical fiber to move it in the axial direction of the optical fiber.

Advantageously, a four-quadrant diode, as used in GB-A 2 082 342, is used as the four-quadrant measuring device.

When the focusing lens is spatially connected to the four-quadrant measuring device, it can be accurately and unremovably fixed relative to the four-quadrant measuring device at a distance equal to the focal length. The smallest possible light spot is formed on the face of the four-quadrant measuring device when the light beam issuing from the lens of the connector extends in a parallel direction in the desired manner, i.e. when in the same of geometrical optics a parallel beam is adjusted.

BRIEF DESCRIPTION OF THE DRAWINGS

The invention will be explained in greater detail by means of the accompanying drawing.

DETAILED DESCRIPTION OF PREFERRED EMBODIMENTS

Figure 1:
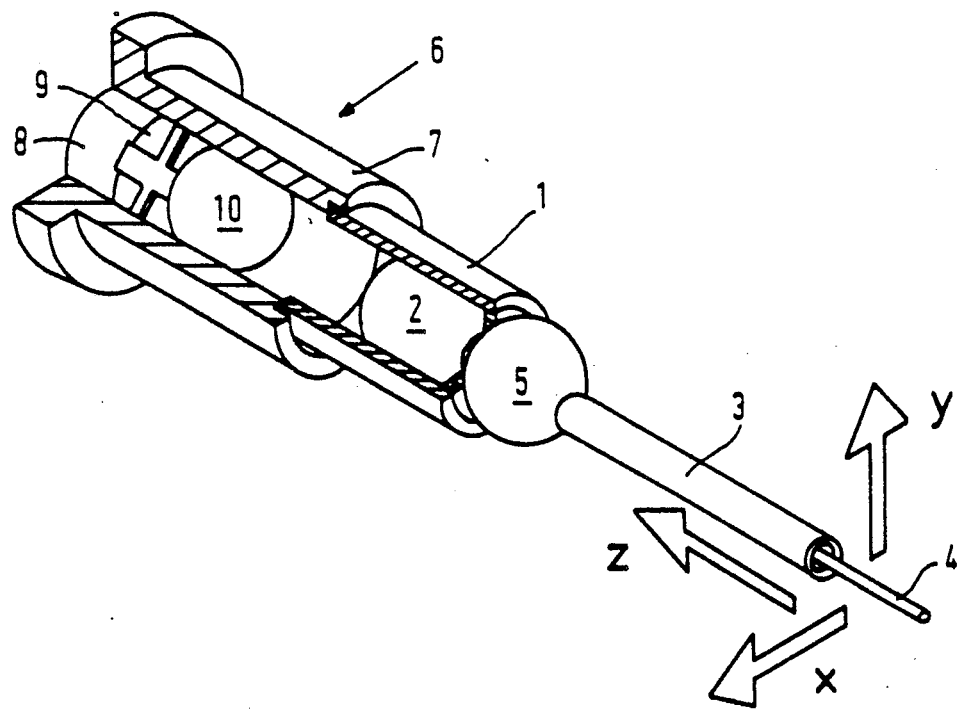
FIG. 1 is a perspective view of a connector element comprising a four-quadrant diode formed according to the invention.

A ball lens 2 is arranged in a connector housing 1. An optical fiber 4 which is inseparably embedded in a connector pin 3 must be aligned relative to the ball lens 2 in such a manner that a beam which issues from said optical fiber 4 which is expanded by the ball lens 2 extends in a direction which is coaxial with and parallel to the axis of the connector. In the exemplary embodiment, the coaxiality is adjusted by tilting the connector pin 3 in the directions of the x and y coordinates. Tilting is effected about a ball 5 which pivotally engages with the connector housing 1.

Parallel alignment of the beam issuing from the ball lens 2 is achieved by axially moving the connector pin 3 in the ball 5. Said beam is directed at a sensor 6 whose housing 7 is provided on the connector housing 1 so as to be coaxially aligned therewith. A four-quadrant diode 8 centered at the end portion of the housing 7, the front face of said diode carrying photodiodes 9 in each of its four-quadrants. A sensor-ball lens 10 is secured to the housing 7 in front of the light-sensitive faces of the photodiodes 9 at a distance equal to the focal length.

Figure 2:
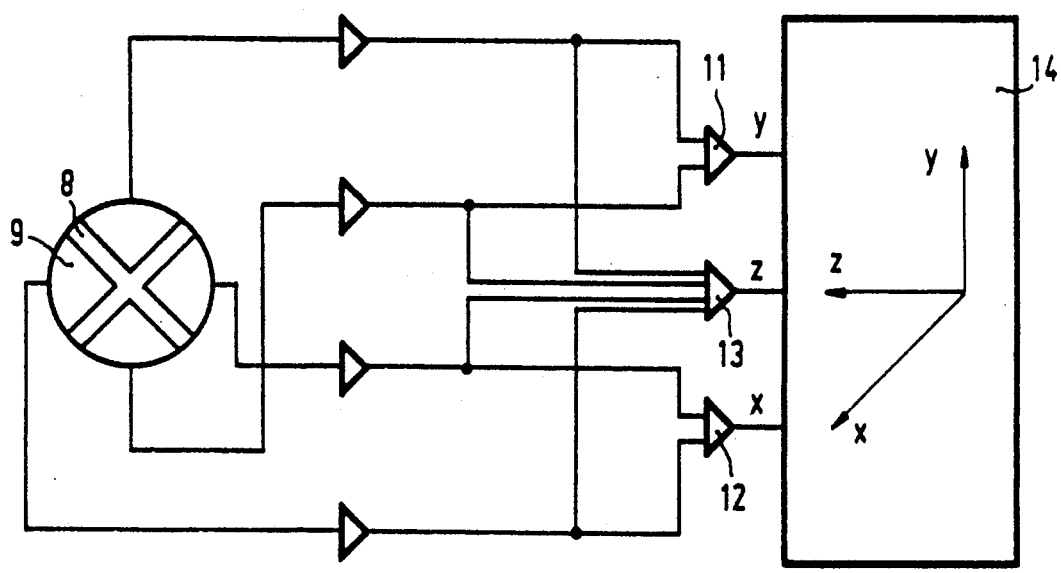
FIG. 2 shows a control circuit for driving a manipulator according to the invention using the output signals of a four-quadrant diode.

The inventive method of positionally aligning the optical fiber 4 is explained by means of FIG. 2. The pre-amplified output signals of diametrally opposite photodiodes 9 of the four-quadrant diode 8 are substracted from each other through differential amplifiers 11 and 12, so that corresponding differential signals are available at the outputs of the differential amplifiers 11 and 12, which differential signals form, in known manner (cf. GB-A 2 082 342), a measure of the diviation of the beam center from the center of the four-quadrant diode in the coordinate directions x and y.

According to the invention, the sum of the individual signals of all the photodiodes 9 is additionally formed in a summing amplifier 13. The output signal of the summing amplifier 13 forms a criterion for the position of the optical fiber 4 in the z-direction.

The output signals of the differential amplifiers 11 and 12 and of the summing amplifier 13 are supplied to the control circuit of a manipulator 14 which can move the connector pin in the coordinate directions x, y and z (cf. FIG. 1). The optimum adjustment of the optical fiber 4 is obtained when all the output signals of the differential amplifiers 11 and 12 and of the summing amplifier 13 are minimized. Preferably, the values of the x and y coordinates are first optimized by the manipulator 14 after which the value of the output signal of the summing amplifier 13 is minimized.

According to the invention, the use of a single four quadrant diode 9 as a position sensor for the optical fiber 4 suffices to adjust the optimum position in all three coordinates directions.

We claim:

1. A device for aligning an optical fiber (4) with respect to a lens (2) of a connector, the optical fiber (4) being aligned such that a beam issuing from the optical fiber (4) and passing through the lens (2) is directed concentrically at a four-quadrant measuring device (8), said aligning device, comprising means for moving the optical fiber (4) relative to the said lens (2) and a four-quadrant measuring device (8) at which the beam issuing from the optical fiber (4) is directed, wherein the four-quadrant measuring device (8) is arranged in the focal point of a focusing lens (10), and the output signals of the four-quadrant measuring device (8) are supplied to a summing circuit which forms a sum signal from the individual signals of the four-quadrant elements (9).

2. A device as claimed in claim 1, wherein the sum signal is supplied to a control circuit of a manipulator (12) which cooperates with the optical fiber (4) to move said optical fiber (4) in a direction corresponding to the axial direction of the optical fiber (4).

3. A device as claimed in claim 2, wherein the four-quadrant measuring device is a four-quadrant diode (8).

4. A device as claimed in claim 2, wherein the focusing lens (10) is spatially connected to the four-quadrant measuring device (8).

5. A device as claimed in claim 2, wherein the output signals of diametrically opposite four-quadrant elements (9) of a four-quadrant measuring device (8) are supplied to differential amplifiers (11, 12), the output signals of which are supplied to a control circuit of a manipulator (12) cooperating with the optical fiber (4) in order to adjust the coordinates (x, y) of the optical fiber (4) in a direction perpendicular to the direction of the axis.

6. A device as claimed in claim 5, wherein the four-quadrant measuring device is a four-quadrant diode (8).

7. A device as claimed in claim 6, wherein the focusing lens (10) is spatially connected to the four-quadrant measuring device (8).

8. A device as claimed in claim 1 wherein the four-quadrant measuring device is a four-quadrant diode (8).

9. A device as claimed in claim 8, wherein the focusing lens (10) is spatially connected to the four-quadrant measuring device (8).

10. A device as claimed in claim 8, wherein the output signals of diametrically opposite four-quadrant elements (9) of a four-quadrant measuring device (8) are supplied to differential amplifiers (11, 12), the output signals of which are supplied to a control circuit of a manipulator (12) cooperating with the optical fiber (4) in order to adjust the coordinates (x, y) of the optical fiber (4) in a direction perpendicular to the direction of the axis.

11. A device as claimed in 1 wherein the focusing lens (10) is spatially connected to the four-quadrant measuring device (8).

12. A device as claimed in claim 11, wherein the output signals of diametrically opposite four-quadrant elements (9) of a four-quadrant measuring device (8) are supplied to differential amplifiers (11, 12), the output signals of which are supplied to a control circuit of a manipulator (12) cooperating with the optical fiber (4) in order to adjust the coordinates (x, y) of the optical fiber (4) in a direction perpendicular to the direction of the axis.

13. A device as claimed in 1 wherein the output signals of diametrically opposite four-quadrant elements (9) of a four-quadrant measuring device (8) are supplied to differential amplifiers (11, 12), the output signals of which are supplied to a control circuit of a manipulator (12) cooperating with the optical fibre (4) in order to adjust the coordinates (x, y) of the optical fibre (4) in a direction perpendicular to the direction of the axis.

14. A method of aligning an optical fiber (4) with respect to the lens (2) of a connector, the optical fiber (4) being positioned such that a beam issuing from the optical fiber (4) and passing through the lens (2) is directed concentrically at a four-quadrant measuring device (8), wherein the four-quadrant measuring device (8) is provided with a focusing lens (10) at a distance equal to the focal length of said lens (10), and the axial distance between the front face of the optical fiber (4) and the lens (2) of the connector is adjusted such that the sum of the light intensities measured by the four elements (9) of the four-quadrant measuring device (8) has a minimum value.

15. A method as claimed in claim 14, wherein the distance between the lens (2) of the connector and the front face of the optical fiber (4) is adjusted by means of a manipulator (14) which is controlled by the sum of the signals formed by the individual elements of a four-quadrant measuring device, in such a manner that the sum signal is minimized.

16. A method of aligning an optical fiber as claimed in claim 14, wherein the four-quadrant measuring device (8) is arranged in the focal point of a focusing lens (10), and the output signals of the four-quadrant measuring device (8) are supplied to a summing circuit which forms a sum signal from the individual signals of the four-quadrant elements (9).

17. A method of aligning an optical fiber as claimed in claim 16, wherein the sum signal is supplied to a control circuit of a manipulator (12) which cooperates with the optical fiber (4) to move said optical fiber (4) in a direction corresponding to the axial direction of the optical fiber (4).

18. A method of aligning an optical fiber as claimed in claim 16, wherein the four-guadrant measuring device is a four-quadrant diode (8).

19. A method of aligning an optical fiber as claimed in claim 16, wherein the focusing lens (10) is spatially connected to the four-quadrant measuring device (8).

20. A method of aligning an optical fiber as claimed in claim 16, wherein the output signals of diametrically opposite four-quadrant elements (9) of a four-quadrant measuring device (8) are supplied to differential amplifiers (11, 12), the output signals of which are supplied to a control circuit of a manipulator (12) cooperating with the optical fiber (4) in order to adjust the coordinates (x, y) of the optical fiber (4) in a direction perpendicular to the direction of the axis.

* * * * *